Patented Sept. 6, 1932

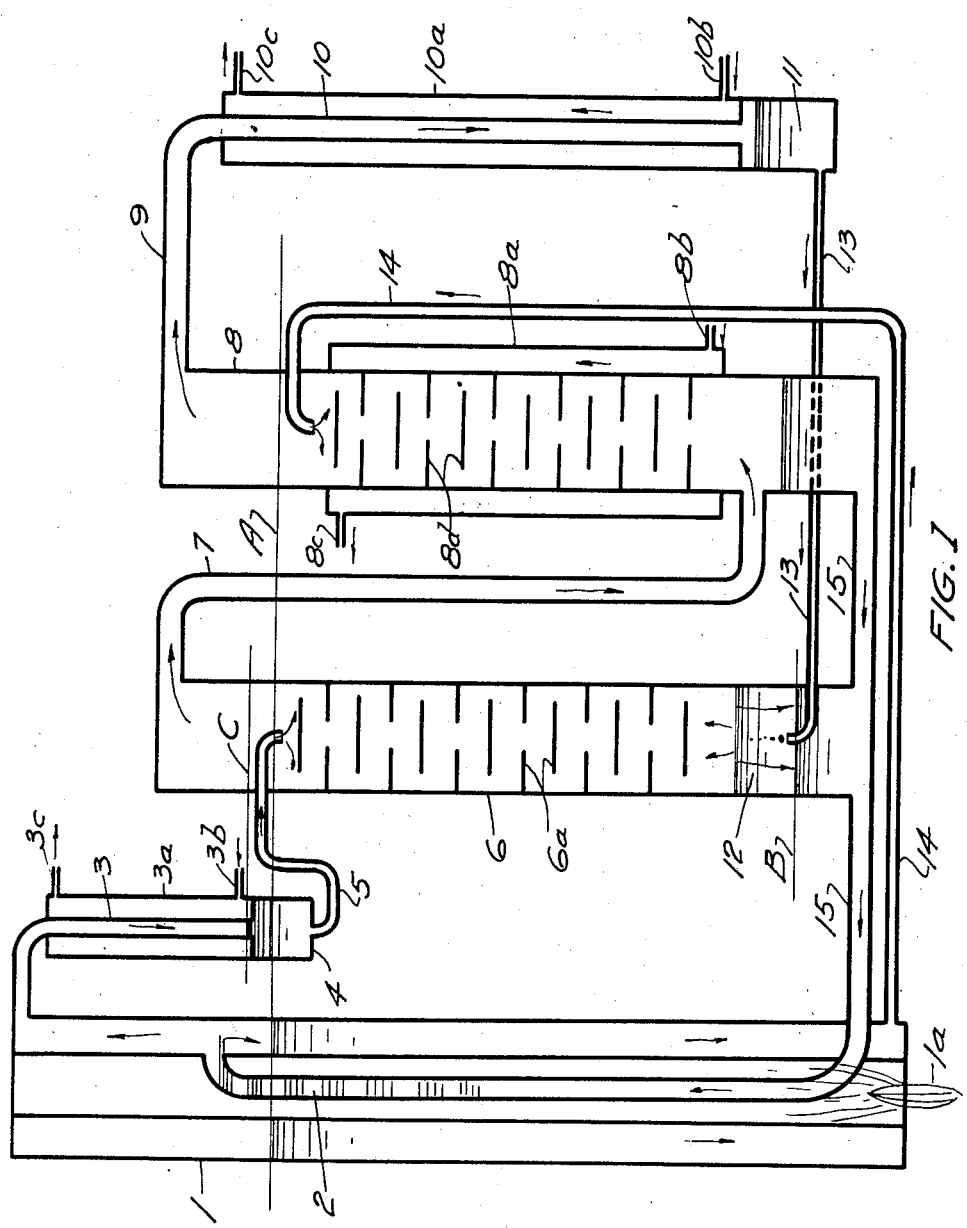

1,875,654

UNITED STATES PATENT OFFICE

BO FOLKE RANDEL, OF SAN DIEGO, CALIFORNIA

MEANS AND METHOD OF REFRIGERATION

Application filed December 10, 1930. Serial No. 501,173.

My invention relates to means and method of refrigeration and the object is to devise an improvement on the means and method as covered by my co-opending application No. 448,276, filed April 29, 1930.

Briefly described, the above co-pending application covers means and method of refrigeration wherein two vessels are interconnected, one vessel containing a highly concentrated solution of a gas in a liquid and the other containing a very weak similar solution. In order to maintain equilibrium, the gas will now separate itself from the liquid in the vessel where the highly concentrated solution was kept, to be absorbed in the liquid in the second vessel. This process will continue until equilibrium is attained, and will be accompanied by abstraction of heat in the first vessel and generation of heat in the second.

In my device as covered by application No. 448,276, I cause constant renewal of the solutions, and therefore continuous action of heat absorption and generation.

In my device as covered by the present application, I increase the action by introducing a tertiary medium, inert towards the other two mediums. That is, if in the vessel containing the strong solution, and which vessel I may call evaporator, is introduced another gas, a condition will arise increasing the evaporation of the gas absorbed in the liquid. The reason for this is the fact that gases in mixture according to the law of Dalton will each occupy the entire space and each under its own pressure, the total pressure in the vessel being the sum of all the partial pressures.

If a solution of a gas in a liquid is introduced in a space filled with another gas, then this space will have the effect of a vacuum towards the introduced solution, and the gas will separate from the liquid.

In co-pending applications, I have covered cases where a gas is bubbled through a solution to permit evaporation of the absorbed gas. In other co-pending applications, I have covered cases where a liquefied gas is introduced in the body of the solution, there to expand and provide spaces for evaporation of the absorbed gas. In other devices, a liquefied refrigerating medium is introduced in a space filled with a non-condensable and inert gas and is caused to boil and evaporate.

In the present application, I introduce a solution of a gas in a liquid in a space filled with an inert and condensable gas, causing evaporation of the absorbed gas forming a mixture of the two gases; then I separate said gases by reabsorbing one and condensing the other, bringing the condensed gas back in liquid state and the absorbed gas in form of solution.

In the accompanying drawing, I illustrate in diagrammatic form an apparatus suitable to carry out my method. The different parts being conventional and well known in the arts, detail description of same is not deemed necessary.

While many different mediums may be employed, I select as illustration ammonia, water, and hydrocarbon gas (hexane, pentane, butane, etc.).

Assume boiler 1 with a solution of ammonia and water. Heat is applied at 1a, driving out the ammonia from the solution, and causing rising of liquid in percolator pipe 2 to a higher elevation. It is assumed that heat is sufficient to drive practically all the ammonia out of the solution and to generate steam or water vapor, so that the space above liquid level is filled with a mixture of steam and ammonia vapor, and so that the liquid remaining in generator 1 is practically water free from ammonia gas.

The liquid which therefore passes through pipe 14 to finally overflow into absorber 8 when level C is raised in generator, is practically pure water. Through suitable cooling arrangement, this water passing through pipe 14 is cooled.

The water and ammonia vapor mixture in generator 1 passes over to condenser 3, enclosed in cooling jacket 3a, cooling water entering at 3b and discharging through 3c. In this condenser, the steam is condensed to liquid, and in forming this liquid the ammonia vapor will be absorbed. By this method, it is possible to get a maximum concentrated solution which solution will overflow into evaporator 6 through pipe 5. Evaporator 6 may be equipped with baffle plates 6a to break up the downflowing liquid.

The lower part of evaporator 6 contains below line B medium weak solution and above line B liquefied hydrocarbon gas; this liquid being lighter than the water-ammonia solution, it will float on top. The solution which therefore falls through evaporator will pass through the liquid hydrocarbon, which liquid will act as a seal above the solution.

Now with liquefied hydrocarbon gas present in evaporator, this evaporator will be filled with hydrocarbon gas vapor at a certain vapor pressure. Into this space the highly concentrated solution of ammonia and water will fall, with the result that the ammonia gas will separate from the water. With the separation of ammonia gas, the vapor pressure on the hydrocarbon liquid will be lowered, and additional hydrocarbon vapor will be generated.

As is described above, nearly pure water entered into absorber 8 through pipe 14. As this absorber 8 is in communication with evaporator through pipe 7, and consequently filled with both ammonia and hydrocarbon vapor, the downflowing water will absorb the ammonia gas and cause increase of pressure on the hydrocarbon vapor. This vapor will pass over to condenser 10 to be liquefied in same by cooling water in jacket 10a, the liquid hydrocarbon returning to evaporator through pipe 13.

The liquid in lower end of absorber 8, which absorber is cooled by water in jacket 8a, is now a solution of ammonia and water, which solution, together with solution in lower part of evaporator is returned to percolator pipe 2 in generator 1 through pipe 15.

The evaporation of ammonia from the solution in evaporator 6 will cause absorption of heat.

Numerous coolers are shown in the illustration. In actual practice, a good deal of the loss of cooling water and also large demands on heat required may be offset by introducing heat exchangers. Such heat exchangers being conventional in devices of this nature, it is not deemed necessary to show same, any such arrangements suitable for my method being included in my invention.

In the illustration and description I show an apparatus wherein circulation depends entirely on a thermal action. However, I may also introduce mechanical means to assist in such circulation. I may add a mechanical pump in pipe 7, either a direct pump or a liquid jet pump to pull vapors from 6 to 8, and by further addition of valves regulate the flow to carry out my process. Such an arrangement will be advantageous in larger installations, where a more active and positive circulation is required. Such an arrangement is included in my invention.

I claim:

1. The method of refrigeration comprising introducing a solution of a gas in a liquid into a space filled with a supplementary gaseous medium inert towards the solution, separating the gas in solution from the liquid forming a mixture of said gas and said inert gaseous medium, then separating said separated gas from said supplementary gas by reabsorbing one in the liquid and condensing the other to liquid state.

2. That improvement in the art of refrigerating comprising vaporizing a solution of a gas in a liquid, condensing vapors of said liquid re-absorbing said gas into said condensate forming a rich solution, bringing said rich solution into the presence of an auxiliary fluid in pressure proportions so as to separate said gas from said rich solution, and forming a mixture of vapors and separating said gas from said mixture by re-absorbing same into said liquid.

3. In a method of refrigeration of the heat of solution type with pressure equalizing agent, partially vaporizing a solution of a gas in an absorption liquid forming a mixture of vapors, condensing vapors of said liquid and absorbing said gas in said condensate forming a rich solution, introducing said rich solution into a space partially filled with liquefied inert insoluble pressure equalizing agent causing separation of said gas from said absorption liquid with resultant absorption of heat and forming a mixture of vapors, introducing said mixture in a space and in contact with an absorption liquid and separating the gas from said pressure equalizing agent by absorption of said gas in said absorption liquid and condensing of said pressure equalizing agent to liquid state, bringing each agent back to points of beginning thus completing the cycle.

4. A method of refrigeration, comprising boiling a solution of ammonia and water vaporizing the ammonia and part of the water, condensing the water vapor and re-absorbing the ammonia forming a rich solution, introducing said rich solution of ammonia and water into a space partially filled with a liquid inert towards the solution and immiscible with same, evaporating the ammonia out of the solution and mixing vapors of ammonia with vapors of the liquid, and separating the vapors from each other by re-absorption of the ammonia into water and condensing of the remaining vapor to liquid state.

5. A method of refrigeration employing a solution of a soluble gas in an absorption liquid as refrigerating agent and a condensable, insoluble and inert gas as pressure equalizing agent, the heat absorption taking place in separating the soluble gas from the absorption liquid in a space filled with saturated vapors of said equalizing agent and in the presence of said equalizing agent in liquid state.

6. Refrigerating apparatus comprising a generator for evaporating a cooling agent out of an absorption agent and part of the absorption agent, a condenser-absorber for condensing the evaporated absorption agent and absorbing the cooling agent in said condensate forming a rich solution, an evaporator and means to introduce said rich solution into said evaporator in the presence of an inert pressure equalizing agent in said evaporator, an absorber and means to pass a vapor mixture from said evaporator to said absorber, means to introduce weak solution from said generator into said absorber, a condenser and means to pass inert gas from said absorber to said condenser and further means to pass condensate from said condenser to said evaporator and means to return solution from said evaporator and said absorber back to said generator.

7. The method of refrigeration which comprises:—by the application of heat separating a gas from a rich solution of said gas in an absorption agent and vaporizing part of said absorption agent forming a weak solution and a mixture of gas and vapor, condensing said vapor of said absorption agent and absorbing said gas into the condensate thus formed producing a rich solution, introducing said rich solution into an evaporator in the presence of an inert fluid in pressure proportions so as to weaken said rich solution and forming a mixture of gas and vapor of said inert fluid, bringing said mixture of gas and vapor of said inert fluid in the presence of the first mentioned weak solution, thus causing separation of said gas from the vapor of said inert fluid by the absorption of said gas in said weak solution enriching same, returning said enriched solution and said weakened solution to said place of heat application and said inert fluid back to said evaporator.

In testimony whereof, I have hereunto set my hand at San Diego, California, this 3rd day of October 19, 1930.

BO FOLKE RANDEL.